(12) United States Patent
Nalette et al.

(10) Patent No.: US 7,943,547 B2
(45) Date of Patent: May 17, 2011

(54) SELECTIVE CATALYTIC OXIDATION OF AMMONIA TO WATER AND NITROGEN

(75) Inventors: Timothy A. Nalette, West Stafford, CT (US); Catherine Thibaud-Erkey, South Windsor, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 1645 days.

(21) Appl. No.: 11/226,780

(22) Filed: Sep. 14, 2005

(65) Prior Publication Data

US 2007/0059228 A1   Mar. 15, 2007

(51) Int. Cl.
*B01J 23/00* (2006.01)
*B01J 21/00* (2006.01)
*B01J 29/00* (2006.01)
*B01J 20/00* (2006.01)

(52) U.S. Cl. ........ 502/262; 502/261; 502/326; 502/339; 502/439

(58) Field of Classification Search .................. 502/261, 502/262, 326, 339, 439
See application file for complete search history.

(56) References Cited

U.S. PATENT DOCUMENTS

| | | | | |
|---|---|---|---|---|
| 2,079,404 A * | 5/1937 | Harris | ............................ | 502/262 |
| 2,083,824 A * | 6/1937 | Bond et al. | ..................... | 423/374 |
| 2,123,732 A * | 7/1938 | Walsh et al. | .................... | 502/261 |
| 2,200,522 A * | 5/1940 | Streicher | ........................ | 502/262 |
| 2,623,860 A * | 12/1952 | Haensel | ......................... | 502/230 |
| 2,854,401 A * | 9/1958 | Weisz | ...................... | 208/111.35 |
| 2,854,403 A * | 9/1958 | Weisz | ............................ | 208/138 |
| 2,861,958 A * | 11/1958 | Barrett | .......................... | 502/262 |
| 2,891,013 A * | 6/1959 | Myers | ............................ | 502/262 |
| 2,961,414 A * | 11/1960 | Lefrancois et al. | ........... | 502/235 |
| 3,161,605 A * | 12/1964 | Stiles et al. | .................... | 502/243 |
| 3,522,269 A * | 7/1970 | Fritze et al. | .................... | 548/564 |
| 3,894,965 A * | 7/1975 | Foster et al. | ................... | 502/261 |
| 3,903,020 A * | 9/1975 | Sergeys et al. | ................. | 502/262 |
| 3,956,185 A * | 5/1976 | Yagi et al. | ..................... | 502/241 |
| 4,076,792 A * | 2/1978 | Foster et al. | ................ | 423/213.5 |
| 4,077,913 A * | 3/1978 | Acres et al. | .................... | 502/302 |
| 4,157,316 A * | 6/1979 | Thompson et al. | ........... | 502/304 |
| 4,537,873 A * | 8/1985 | Kato et al. | ..................... | 502/242 |
| 4,757,045 A * | 7/1988 | Turner et al. | .................... | 502/252 |
| 4,791,091 A * | 12/1988 | Bricker et al. | .............. | 423/213.5 |
| 4,904,633 A * | 2/1990 | Ohata et al. | .................... | 502/304 |
| 4,956,326 A * | 9/1990 | Yoneda et al. | .................. | 502/178 |
| 5,061,464 A * | 10/1991 | Cordonna et al. | ......... | 423/213.5 |
| 5,128,114 A * | 7/1992 | Schwartz | ....................... | 423/335 |
| 5,145,826 A * | 9/1992 | Hirschberg et al. | ........... | 502/262 |
| 5,175,136 A * | 12/1992 | Felthouse | ....................... | 502/242 |
| 5,202,299 A * | 4/1993 | Symons et al. | ................. | 502/242 |
| 5,208,200 A * | 5/1993 | Soled et al. | .................... | 502/241 |
| 5,275,995 A * | 1/1994 | Bellussi et al. | ............... | 502/207 |
| 5,352,645 A * | 10/1994 | Schwartz | ....................... | 502/262 |
| 5,491,120 A * | 2/1996 | Voss et al. | ..................... | 502/304 |
| 5,518,978 A * | 5/1996 | Flego et al. | .................... | 502/222 |
| 5,571,763 A * | 11/1996 | Takemoto et al. | ............. | 502/334 |
| 5,879,539 A * | 3/1999 | Mignard et al. | ............... | 208/138 |

(Continued)

*Primary Examiner* — Cam N Nguyen

(74) *Attorney, Agent, or Firm* — Carlson, Gaskey & Olds, P.C.

(57) ABSTRACT

A catalyst includes a platinum coating deposited on a silica support. The support has an average surface area between about 100 $m^2$/g and about 120 $m^2$/g. The platinum coating is between about 5 wt % and about 15 wt % of the catalyst. The combination of the selected surface area, silica support, and selected amount of platinum coating provides a catalytic activation temperature below 200° C. and avoids the formation of $NO_x$.

12 Claims, 1 Drawing Sheet

U.S. PATENT DOCUMENTS

| | | | |
|---|---|---|---|
| 6,022,826 A * | 2/2000 | Deeba et al. | 502/325 |
| 6,165,430 A * | 12/2000 | Kudla et al. | 423/213.5 |
| 6,255,249 B1 * | 7/2001 | Voss et al. | 502/263 |
| 7,030,055 B2 * | 4/2006 | Yaluris et al. | 502/326 |
| 7,452,844 B2 * | 11/2008 | Hu et al. | 502/327 |
| 7,563,743 B2 * | 7/2009 | Euzen et al. | 502/208 |
| 7,563,744 B2 * | 7/2009 | Klein et al. | 502/326 |
| 7,659,224 B2 * | 2/2010 | Shimazaki et al. | 502/180 |
| 2001/0036433 A1 * | 11/2001 | Euzen et al. | 423/245.3 |
| 2006/0183636 A1 * | 8/2006 | Klein et al. | 502/261 |

* cited by examiner

SELECTIVE CATALYTIC OXIDATION OF AMMONIA TO WATER AND NITROGEN

BACKGROUND OF THE INVENTION

This invention relates to catalysts, and more particularly, to platinum catalysts for oxidizing ammonia in vapor phase catalytic ammonia removal systems.

Catalytic systems are widely known and used for decomposing or oxidizing undesirable chemical species within a fluid. Catalytic systems are used in space vehicles and in space stations to remove ammonia and other chemicals from waste streams generated during a space mission. Typically, water-based waste streams are collected, distilled, and purified before being reused by a crew. The weight of such catalytic systems and the amount of energy that the catalytic systems use is minimized to reduce relatively high expenses related to space travel.

Conventional catalysts typically include an active metal deposited on a support material. Typically, the type of active metal and type of support material are selected based upon the application that the catalyst will be used in. Disadvantageously, currently available combinations of active metals and support materials for ammonia oxidation require temperatures above approximately 200° C. to oxidize ammonia and often result in the formation of nitrogen oxide ($NO_x$). To minimize $NO_x$ formation, the catalyst is undesirably operated in a narrow temperature range above the catalysis activation temperature and below the $NO_x$ formation temperature.

Accordingly, there is a need for an ammonia catalyst that operates over a relatively large temperature range and at temperatures below 200° C. to avoid the formation of $NO_x$.

SUMMARY OF THE INVENTION

A catalyst according to the present invention includes a platinum coating deposited on a silica support. A combination of the silica support material with a surface area between about 100 m²/g and about 120 m²/g, and between about 5 wt % and about 15 wt % of platinum provides complete selective catalytic oxidation of ammonia at temperatures as low as 150° C. and avoids the formation of $NO_x$, until temperatures exceeding 200° C.

In one example, a reactor containing a catalyst is connected to a vaporizer. The vaporizer vaporizes liquid waste water containing ammonia. The catalyst oxidizes the gaseous ammonia to form nitrogen and water.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
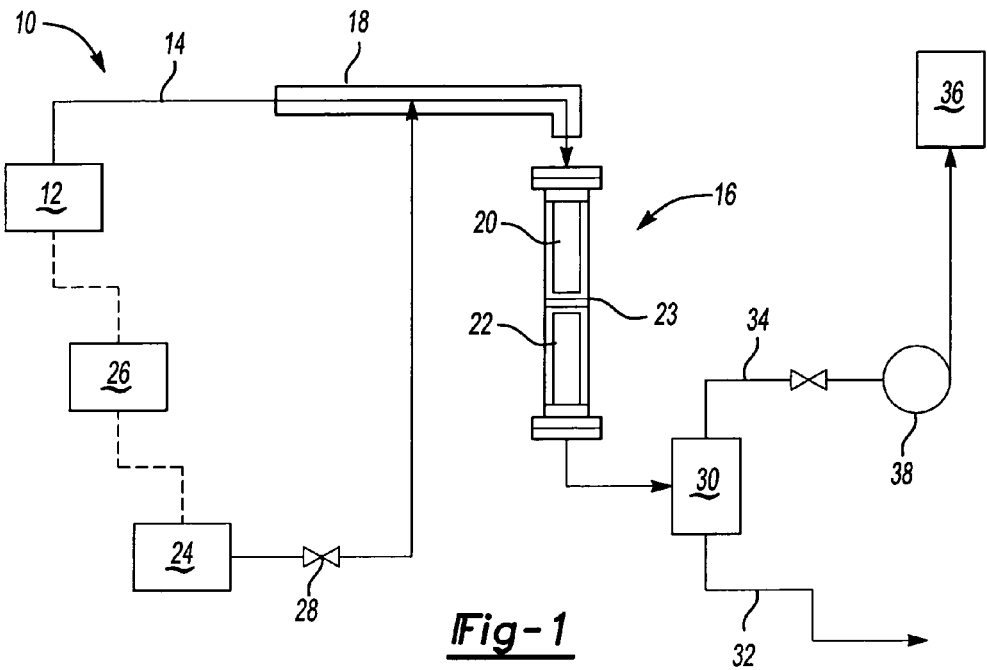
FIG. 1 is a schematic view of an example catalytic system according to the present invention.

FIG. 1 illustrates selected portions of an example catalytic system 10 for oxidizing ammonia and hydrocarbons, for example, from a vaporized feed stream. The catalytic system 10 includes a vaporizer 12 that receives a waste water that is collected, for example, from waste urine, wash water, and moisture condensate collected from operating systems on a space vehicle. The vaporizer 12, such as a boiler, vaporizes the waste water. A vaporized stream travels through a conduit 14 to a reactor 16. A heater 18 adjacent to the conduit 14 maintains an elevated temperature along a portion of the conduit 14 to minimize condensation of the vaporized stream.

The reactor 16 includes an ammonia catalyst 20 and a hydrocarbon catalyst 22. The ammonia catalyst 20 oxidizes the gaseous ammonia to produce gaseous nitrogen and gaseous water. The hydrocarbon catalyst 22 decomposes the gaseous hydrocarbons. A heater 23 near the ammonia catalyst 20 and hydrocarbon catalyst 22 maintains the ammonia catalyst 20 at a desired temperature.

The catalytic system 10 includes an oxygen source 24 connected to the conduit 14. A controller 26 in communication with the oxygen source 24 and the vaporizer 12 selectively opens or closes a valve 28 to supply gaseous oxygen into the conduit 14 to provide a selected amount of gaseous oxygen. This provides a benefit of achieving a desired ratio of gaseous oxygen to gaseous ammonia within the conduit 14. In one example, the ratio of gaseous oxygen to gaseous ammonia is set according to stoichiometry for oxidation of the gaseous ammonia at the ammonia catalyst 20 to produce gaseous nitrogen and gaseous water instead of $NO_x$.

The catalytically converted species (e.g., nitrogen, water, and decomposed hydrocarbons) travel from the reactor 16 into a condenser 30. The condenser 30 is maintained at a relatively low temperature to condense the gaseous water. Liquid water is collected from the condenser 30 and fed out of a conduit 32 to a downstream use. Chemical species that were not condensed within the condenser 30 are fed through a conduit 34 and are collected in a receptacle 36 or vented to the environment.

A vacuum pump 38 connected downstream from the condenser 30 maintains a relatively low pressure in the catalytic system 10 to move the vapor stream through the reactor 16.

Figure 2:
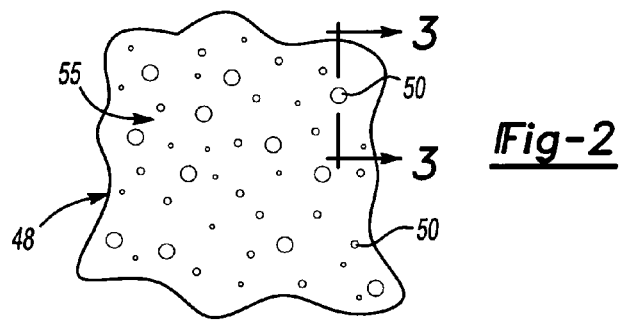
FIG. 2 shows an example granule of a catalytic bed.
Figure 3:
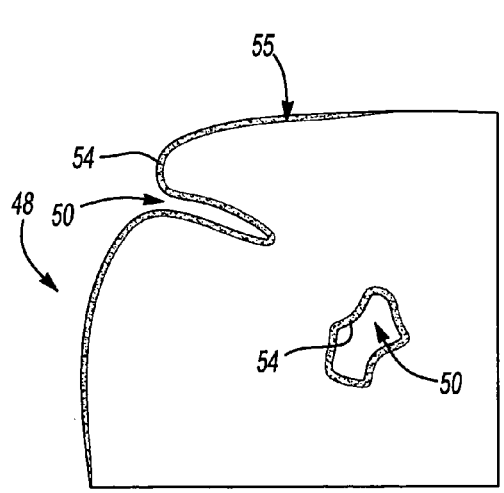
FIG. 3 shows a cross-section of the granule of FIG. 2.

FIG. 2 shows a granule 48, or pellet, used in the ammonia catalyst 20 and FIG. 3 shows a cross-section of the granule 48. The granule 48 is made of a porous homogenous silica material having pores 50. As is known, relatively large numbers of granules 48 can be packed together to form a catalytic bed through which the vaporized stream flows.

The granule 48 includes an average surface area between about 100 m²/g and about 120 m²/g. In one example, the granule 48 is NorPro® silica provided by Saint-Gobain Ceramics & Plastics, Inc.

A platinum catalytic coating 54 is deposited on the granule 48 within the pores 50 and on the outer surface 55 of the granule 48. In one example, the platinum catalytic coating 54 is applied using a known incipient wetness process. In another example, the platinum catalytic coating 54 is applied using a vapor deposition process. The platinum comprises between about 5 wt % and about 15 wt % of the granule 48. In one example, the amount is approximately 10 wt %.

In an incipient wetness process, a platinum salt, such as platinum chloride, is impregnated into the granule 48. The salt fills the volume within the pores 50. The composite of the granule 48 and the platinum salt solution is then dried in air, for example, to remove at least a portion of a liquid carrier of the platinum salt solution. During the drying, platinum chloride is converted to a platinum oxide on the surfaces of the granule 48. The platinum oxide is then reduced to platinum metal in a known manner using hydrogen gas to form the platinum catalytic coating 54. At this stage, some residual chloride from the platinum salt may remain in the platinum catalytic coating 54. The granule 48 is then washed with water to remove at least a portion of the residual chloride and dried to remove the wash water.

The amount of platinum deposited can be controlled by controlling the concentration of the platinum salt in the solution. As is known, the volume of the pores 50 can be determined empirically. The pore 50 volume in combination with a selected concentration of platinum salt in the solution results in a determinable amount of platinum metal deposited on the surfaces of the granule 48 (including the pore 50 surfaces).

The combination of the selected surface area, homogenous silica granule 48, and selected amount of platinum results in selective oxidation of ammonia at temperatures under 200° C. This provides the benefit of operating the ammonia catalyst 20 within a temperature window of, for example, 150° C. to 200° C. to form nitrogen and water instead of $NO_x$.

Figure 4:
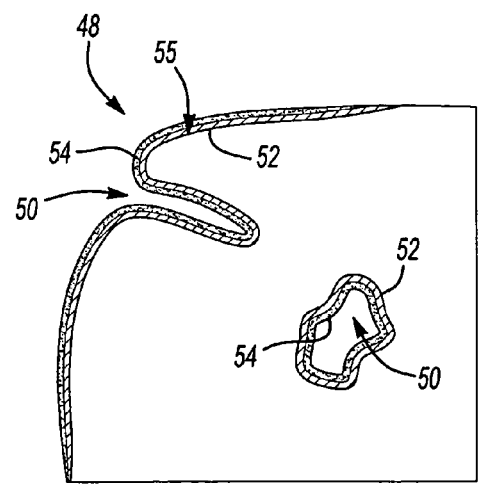
FIG. 4 shows a cross-section of a second embodiment of the granule of FIG. 2.

Alternatively, as shown in FIG. 4, the granule 48 is made of relatively low surface area silica, alumina, metal, or other material and a relatively high surface area silica washcoat 52 is deposited in a known manner within the pores 50 and on the outer surface 55 of the granule 48. The silica washcoat 52 increases the surface area of the low surface area material. The platinum catalytic coating 54 is deposited on the silica washcoat as described above.

In another example, the granule 48 includes a silica aerogel for supporting the platinum. The silica aerogel can be used in granule shape or in other shapes such as disks. The silica aerogel includes an average surface area of about 800 $m^2/g$. The relatively high surface area results in a weak support that may crumble easily, however, a silica aerogel may be suitable for application where strength is not a significant concern.

In one example, the silica aerogel includes about 16 wt % platinum deposited on the surfaces using an incipient wetness process as described above. The combination of the silica aerogel and 16 wt % platinum provides the benefit of an ammonia catalytic activation temperature that is about 125° C. and avoids formation of $NO_x$.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A catalyst comprising:
a silica support including an average surface area between about 100 $m^2/g$ and about 120 $m^2/g$; and
a catalyst coating including platinum, said catalyst coating being supported by said support, and said catalyst coating comprising between about 5% and about 15% of a combined mass of said support and said catalyst coating.

2. The catalyst as recited in claim 1, wherein said silica support includes a porous silica pellet.

3. The catalyst as recited in claim 1, wherein said catalyst coating consists essentially of platinum.

4. The catalyst as recited in claim 1, wherein said catalyst coating comprises about 10% of the combined mass.

5. A catalyst comprising:
a silica support including an average surface area between about 100 $m^2/g$ and about 120 $m^2/g$, said silica support further comprises a silica washcoat and a catalyst coating deposited on said silica washcoat; and
said catalyst coating including' platinum, said catalyst coating being supported by said support, and said catalyst coating comprising between about 5% and about 15% of a combined mass of said support and said catalyst coating.

6. A catalyst comprising:
a silica support; and
a catalyst coating including platinum, said catalyst coating being supported by said support, and said catalyst coating comprising between about 5% and about 15% of a combined mass of said support and said catalyst coating, wherein said catalyst coating has an ammonia catalyst activation temperature below about 200° C.

7. A catalyst comprising:
a support including a silica aerogel having an average surface area of about 800 $m^2/g$;
a platinum catalyst coating on said support, said platinum catalyst coating having an ammonia catalyst activation temperature below about 200° C.

8. The catalyst as recited in claim 7, wherein said platinum catalyst coating comprises about 16% platinum by mass.

9. The catalyst as recited in claim 7, wherein said ammonia catalyst activation temperature is about 125° C.

10. A silica support including an average surface area between about 100 $m^2/g$ and about 120 $m^2/g$ and including a porous silica pellet including a porous inner silica core, said porous silica pellet being coated on exterior surfaces thereof with a catalyst coating; and
the catalyst coating including platinum, said catalyst coating being supported by said support, and said catalyst coating comprising between about 5% and about 15% of a combined mass of said support and said catalyst coating.

11. The silica support as recited in claim 10, wherein the porous inner silica core includes pores having pore surfaces coated with the catalytic coating.

12. A catalyst comprising:
a support including a silica aerogel having an average surface area of about 800 $m^2/g$, wherein said support is a porous silica pellet including a porous inner silica core coated on exterior surfaces thereof with a platinum catalyst coating; and
said platinum catalyst coating being on said support, said platinum catalyst coating having an ammonia catalyst activation temperature below about 200° C.

* * * * *